Sept. 12, 1939.  W. M. BARRET  2,172,688
ELECTRICAL APPARATUS AND METHOD FOR GEOLOGIC STUDIES
Filed Aug. 19, 1937  9 Sheets-Sheet 1

Inventor
WILLIAM M. BARRET
By A. F. Flournoy
Attorney

Sept. 12, 1939.    W. M. BARRET    2,172,688
ELECTRICAL APPARATUS AND METHOD FOR GEOLOGIC STUDIES
Filed Aug. 19, 1937    9 Sheets-Sheet 2

FIG. 4

Inventor
WILLIAM M. BARRET
By A. F. Flournoy
Attorney

FIG. 4A

Sept. 12, 1939. W. M. BARRET 2,172,688
ELECTRICAL APPARATUS AND METHOD FOR GEOLOGIC STUDIES
Filed Aug. 19, 1937 9 Sheets-Sheet 4

FIG. 5

Inventor
WILLIAM M. BARRET
By A. F. Flournoy
Attorney

FIG. 5A

Sept. 12, 1939.  W. M. BARRET  2,172,688
ELECTRICAL APPARATUS AND METHOD FOR GEOLOGIC STUDIES
Filed Aug. 19, 1937  9 Sheets-Sheet 6

Inventor
WILLIAM M. BARRET
By A. F. Flournoy
Attorney

Sept. 12, 1939.  W. M. BARRET  2,172,688
ELECTRICAL APPARATUS AND METHOD FOR GEOLOGIC STUDIES
Filed Aug. 19, 1937  9 Sheets-Sheet 7

Inventor
WILLIAM M. BARRET

By A. F. Flournoy
Attorney

Sept. 12, 1939.　　　　W. M. BARRET　　　　2,172,688
ELECTRICAL APPARATUS AND METHOD FOR GEOLOGIC STUDIES
Filed Aug. 19, 1937　　　9 Sheets-Sheet 8

Inventor
WILLIAM M. BARRET

Sept. 12, 1939. W. M. BARRET 2,172,688
ELECTRICAL APPARATUS AND METHOD FOR GEOLOGIC STUDIES
Filed Aug. 19, 1937 9 Sheets-Sheet 9

Inventor
WILLIAM M. BARRET
By A. F. Flournoy
Attorney

Patented Sept. 12, 1939

2,172,688

UNITED STATES PATENT OFFICE 2,172,688

ELECTRICAL APPARATUS AND METHOD FOR GEOLOGIC STUDIES

William M. Barret, Shreveport, La., assignor to Engineering Research Corporation, Shreveport, La.

Application August 19, 1937, Serial No. 159,878

16 Claims. (Cl. 175—182)

This invention relates to electrical prospecting apparatus, and to methods of utilizing the same. More particularly, the herein disclosed apparatus and methods make use of electromagnetic waves, whereby useful subsurface geologic information is acquired which was not obtainable by means previously available.

One of the objects of this invention is to provide a practical and reliable technique for determining the location and character of hidden geologic faults.

Another object of the invention is to make available a satisfactory means for locating and defining buried masses whose electrical admittances differ sufficiently from that of the surrounding media, such as a buried salt dome or igneous plug.

Another object of this invention is to furnish a useful means of locating and defining electrical discontinuities in buried strata, such as occur in a porous stratum at the boundary between salt water and oil, or salt water and natural gas, or when a stratum of high admittance is interrupted by a fault plane, or when such a stratum "wedges out."

Another object is to provide an effective means of locating and mapping the position of buried deposits of oil or natural gas, by defining the peripheral contact between said oil or gas and adjacent material, such as salt water, whose electrical constants differ sufficiently from those of said oil or gas.

An addititonal object is to make available a workable technique for locating and defining minerals other than oil or gas, such as a gold deposit which occurs in a mineralized vein, when the electrical properties of said minerals differ sufficiently from that of the surrounding media.

A further object is to provide apparatus and methods for determining other useful geologic information for which the invention is adapted.

The present case is a continuation in part of my earlier filed application, Serial No. 103,036, filed September 28, 1936, which discloses and claims specific forms of the invention disclosed and generically claimed herein.

It is well known that the flow through the earth of electric currents, and the propagation through the earth of electromagnetic waves, are influenced by such geoelectrical constants as the electrical conductivity, dielectric constant, and magnetic susceptibility of the involved media. Numerous types of apparatus and methods have been proposed for utilizing variations in one or more of these geoelectrical constants in order to delineate the geologic structure of a given area, or to determine the presence, location and extent of buried mineral deposits. As ordinarily practiced, the former systems have employed direct current, interrupted direct current, commutated direct current, low frequency alternating current, and alternating current of moderately high frequency.

When operating above the audio spectrum the former techniques have utilized electromagnetic waves whose frequencies rarely exceeded 50 kilocycles (50,000 cycles per second), and the magnitude of the electrical energy radiated has been relatively low. Moreover, the distance between the conventional generators and receiving apparatus has been comparatively small (less than one wave length), so small, in fact, that their operations were necessarily predicated on the induction component of the electromagnetic field. With the present invention the distance between the generator and receiver at times exceeds 11 miles (more than 100 times the wave length of the electrical oscillations customarily employed), which means that the operations are dependent on the radiation component of the oscillatory field, and that the influence of the induction component is negligible. The former systems have involved either the determination of angular relations of the elliptically polarized electromagnetic field observed at the receiving apparatus, or the determination of the direction of propagation of the resultant field at selected points. As distinguished from these procedures, one of the principal modes of operation of the invention disclosed herein is based entirely on a determination of the magnitude of the electromagnetic field present at the receiver. Further discussion in these specifications of the electromagnetic field will refer specifically to the electric component of the field.

The present invention concerns the provision of a relatively powerful transmitter of high frequency electromagnetic oscillations (for example: 80 watts at 1,900 kilocycles have been used successfully), a particular form of transmitting antenna which permits varying the direction of maximum propagation of said electromagnetic oscillations, a sensitive receiver which, with its associated loop antenna, is designed to determine at various and distant points the character of the electromagnetic field associated with the oscillations originating at the transmitter.

In practicing this invention, a line of traverse is arranged to intersect approximately at right angles the strike of the fault plane or mineralized vein, or to cross the area embracing the body of oil or gas or other geologic feature to be investigated, and the transmitter is placed near one extremity of this line, its antenna, which possesses directional properties, being oriented into the line of traverse. One method of operation is predicated on measuring at various points along the line of traverse the strength of the electromagnetic field arising at the transmitter. The presence beneath a portion of the traverse of a fault plane or mineralized vein, or an accumulation of oil or gas, or the presence of a geologic feature identified by characteristic electrical properties, gives rise to anomalous values of field intensity within this interval, and the location and character of the anomaly thus found indicates the location and character of the fault plane or mineralized vein, or the location and extent of the body of oil or gas, or other disturbing geologic feature.

Figure 1:
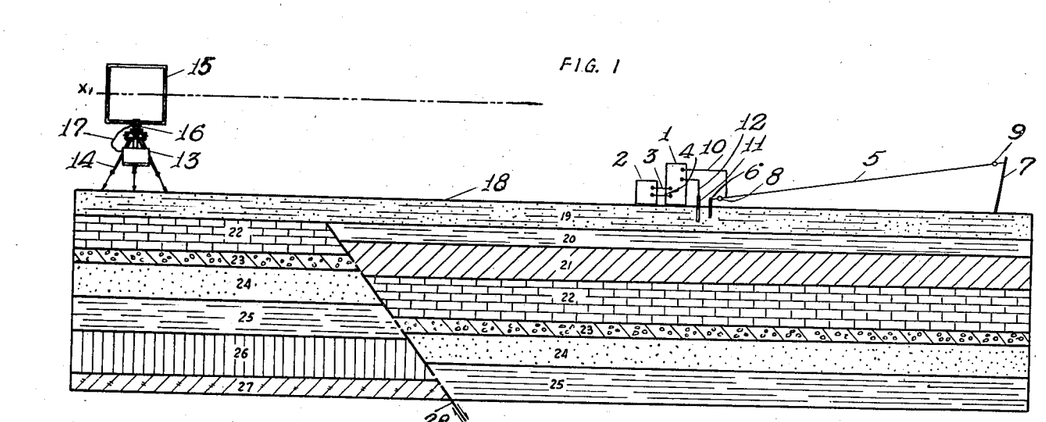
Fig. 1 is a geologic cross-section of a series of faulted strata, and a diagrammatic representation of the principal electrical components embodied in this invention.

Referring to Fig. 1 by numerals, 1 indicates the transmitter, 2 the power source for energizing the transmitter, which may be a gasoline-driven alternator having good voltage regulation, 3 and 4 the wires for transferring electrical energy from the power source to the transmitter, 5 the antenna which is supported by poles 6 and 7 and insulators 8 and 9, 10 the wire connecting the antenna with the transmitter, 11 a metallic rod making intimate electrical contact with the earth, and 12 the wire joining the "ground" with the transmitter. The receiver 13 is supported by the tripod 14, and is energized by the rectangular loop 15, which may be rotated about a vertical and a horizontal axis. Provision is made for leveling the tripod head 16, and for finding the angles made by the plane of the loop with vertical and horizontal reference planes. The dual-conductor cable 17 connects the loop circuit with the input terminals of the receiver. The surface of the earth is denoted by 18, and in descending order the formations 19, 20, 21, 22, 23, 24, 25, 26 and 27 comprise the stratigraphic section illustrated. A fault plane, which does not extend through the formation 19, is indicated by 28, the strata to the right side of the fault plane being downthrown with respect to the similar strata to the left side of the fault plane.

Figure 4:
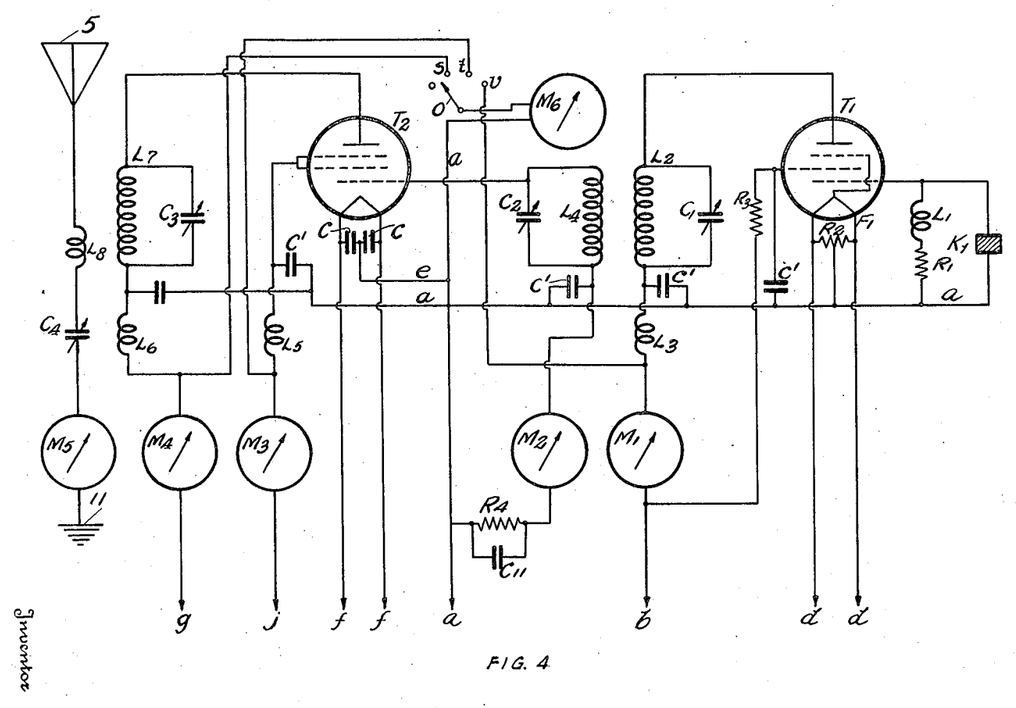
Fig. 4 is a circuit diagram of one form of the transmitter.

With reference to Fig. 4, the transmitter consists of a crystal-controlled, radio-frequency oscillator, which is used to excite an amplifier, the output circuit of which is coupled to an antenna.

The crystal oscillator is built around the pentode vacuum tube $T_1$ in whose grid circuit is the quartz crystal $K_t$, the choke coil $L_1$ and the grid leak $R_1$. The wire $a$ is connected to the center of the resistor $R_2$ across the tube filament $F_1$. This wire $a$ is connected to the low potential or negative terminal of the high potential direct current power supply which furnishes the power for the plate and screen circuits of the crystal oscillator and amplifier. Approximately 350 volts D. C., which is obtained from the power supply at $b$, is applied to the screen through the resistor $R_3$. Also, voltage from $b$ is applied to the plate through the inductance $L_2$, the radio-frequency choke $L_3$ and the meter $M_1$. The inductance $L_2$ and the variable condenser $C_1$ form a circuit whose LC constant is so adjusted as to cause the tube $T_1$ and associated circuits to oscillate at the frequency determined by the crystal $K_t$. The proper voltage is obtained at $d$, $d$ to heat the filament $F_1$.

The single-stage amplifier is built around the pentode vacuum tube $T_2$, in whose grid circuit is the inductance and capacitance combination $L_4$ and $C_2$, the meter $M_2$ and the resistance-capacitance network $R_4$, $c''$, which are tied to wire $a$. The radio-frequency path to the filament is completed through the wire $e$, connected to the junction of condensers $c$, $c$, which are in series across the filament. The direct-current path to the filament is completed by tying wire $a$ to the center tap of the filament-heating transformer whose outside lines are connected to $f$, $f$. This transformer is part of the conventional power supply. There is inductive coupling between inductances $L_2$ and $L_4$ which causes radio-frequency energy to be transferred from the plate circuit of tube $T_1$ to the grid circuit of tube $T_2$, thereby exciting the grid of tube $T_2$ at the frequency of the crystal $K_t$. Voltage, approximately 150 volts, is applied to the screen and suppressor through the choke coil $L_5$ and the meter $M_3$. This E. M. F. is obtained from a voltage divider in the power supply applied at $j$.

Voltage from the power supply is applied at $g$, thence through the meter $M_4$, choke coil $L_6$, inductance $L_7$, to the plate of the tube $T_2$. Inductance $L_7$ and the condenser $C_3$ constitute the tuned tank circuit of the amplifier which is coupled to the inductance $L_8$. The antenna network is made up of the elevated wire 5, the inductance $L_8$, the variable condenser $C_4$, the meter $M_5$, and the earth or "ground" 11. By adjusting $C_3$ and $C_4$ the system composed of the antenna and tank circuits is made resonant to the crystal frequency.

All fixed condensers $c'$ have one side connected to wire $a$, thereby enabling radio-frequency currents to return directly to the filaments and keeping the radio-frequency currents out of the D. C. meters and power supply. The radio-frequency by-pass across $R_4$ is $c''$.

All meters measure current except $M_6$, which is a voltmeter. Switch arm $o$, by making contact with points $s$, $t$, $v$, enables the successive reading with $M_6$ of the plate and screen voltages on the amplifier tube, and the plate voltage on the oscillator tube. By keeping all meter and variable condenser readings constant, the energy dissipated by the antenna, and the frequency of radiation, are kept constant within very narrow limits.

The power supply is of conventional design, deriving its input from a 110-volt, 60-cycle, A. C. source.

Figure 5:
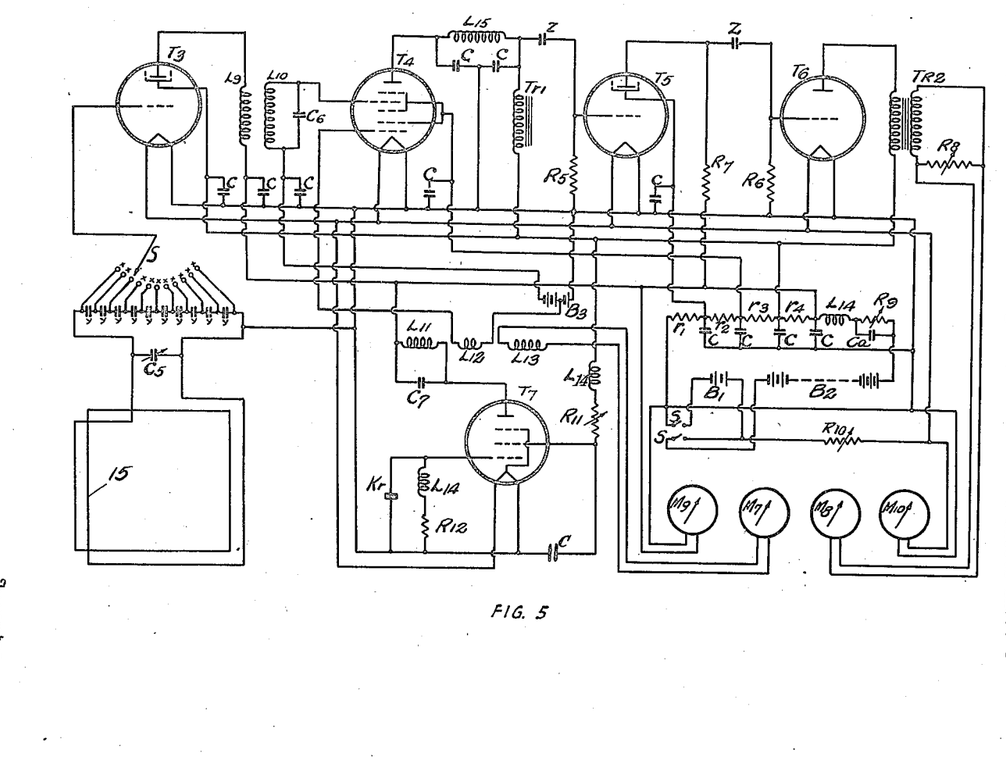
Fig. 5 is a circuit diagram of one form of the receiver.

In Fig. 5 is illustrated the circuit diagram of the receiver, which is designed to measure field intensity rapidly and with the least amount of apparatus feasible. The pick-up is the loop antenna 15, which is tuned to the frequency of the transmitter by the condenser $C_5$. All of the radio-frequency voltage across $C_5$, or a fractional part, may be applied to the grid of the tube $T_3$ by varying the position of the switch arm S, which makes contact with any of the points $x$. The points denoted $x$ are taps taken at junction points of the ten condensers $y$ connected in series across $C_5$.

Coupling between tubes $T_3$ and $T_4$ is obtained by the tuned radio-frequency transformer made up of inductances $L_9$ and $L_{10}$, and condenser $C_6$. Tube $T_4$ is of the pentagrid type, and is used as a mixer, signal voltage being applied to one grid, and voltage from the local crystal oscillator to another grid.

The crystal oscillator built around tube $T_7$ is of conventional design. The radio-frequency output of $T_7$ is controlled by varying resistor $R_{11}$ in the screen circuit, the output being maintained constant during operation. Inductances $L_{11}$, $L_{12}$ and $L_{13}$ are closely coupled to one another, and if the reading of meter $M_7$, which is energized by inductance $L_{13}$, is kept constant, then the radio-frequency output of $T_7$ remains constant. A part of this output is picked up by $L_{12}$ and applied to a grid of $T_4$. The frequency of the signal appearing in inductance $L_{12}$ is made approximately 2000 c. p. s. different from that appearing in inductance $L_{10}$, by the proper choice of crystals in the transmitter and receiver. Hence there is a low or audible frequency appearing in the plate circuit of $T_4$. This low-frequency signal is amplified in a conventional manner by the two-stage amplifier consisting of tubes $T_5$ and $T_6$, and their associated electrical components. Inductance $L_{15}$ acts as a radio-frequency choke, and $c$, $c$, radio-frequency by-pass condensers, $Tr_1$ is an iron-core plate reactor, $R_5$ and $R_6$ are grid leaks, $R_7$ a plate resistor, $z$, $z$, coupling condensers, $Tr_2$ an output transformer, and $R_8$ a variable resistor which is used as a shunt across the output meter $M_8$ in order to protect the meter from damage when making preliminary adjustments, prior to taking an observation.

In order to keep the gain of the receiver between the grid of tube $T_3$ and the meter $M_8$ constant, the plate and screen voltages are maintained constant by applying a constant voltage, read by meter $M_9$, across the voltage divider made up of resistors $r_1$, $r_2$, $r_3$ and $r_4$, and a constant voltage, read by meter $M_{10}$, across the filaments of the tubes. Adjustment of the variable resistor $R_9$ controls the voltage across $r_1$, $r_2$, $r_3$ and $r_4$, and variable resistor $R_{10}$ controls the filament voltage. The radio-frequency chokes $L_{14}$ help to confine radio-frequency currents to the paths provided through the condensers $c$. The condenser $C_a$ acts as a by-pass across $R_9$. The switches $s$, $s$, permit opening all current paths from the filament battery $B_1$, and the high-tension battery $B_2$. The battery $B_3$ provides grid voltages for the tube $T_4$. Inductances $L_{14}$ are radio-frequency chokes, $R_{12}$ is a grid leak, $K_r$ a quartz crystal whose thermal characteristics approximate those of the transmitter crystal $K_t$, and $C_7$ is a condenser which in combination with $L_{11}$ forms a tuned tank circuit of the oscillator.

Figure 4A:
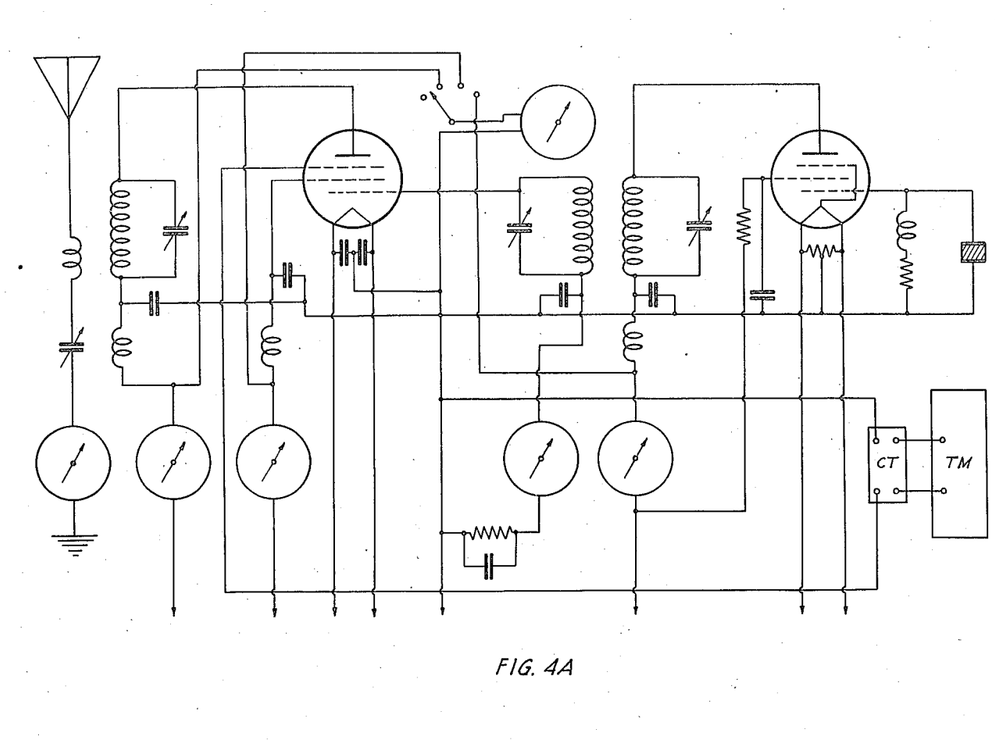
Fig. 4A is a circuit diagram of an alternative form of the transmitter, whereby a modulator is introduced to modulate the carrier waves.
Figure 5A:
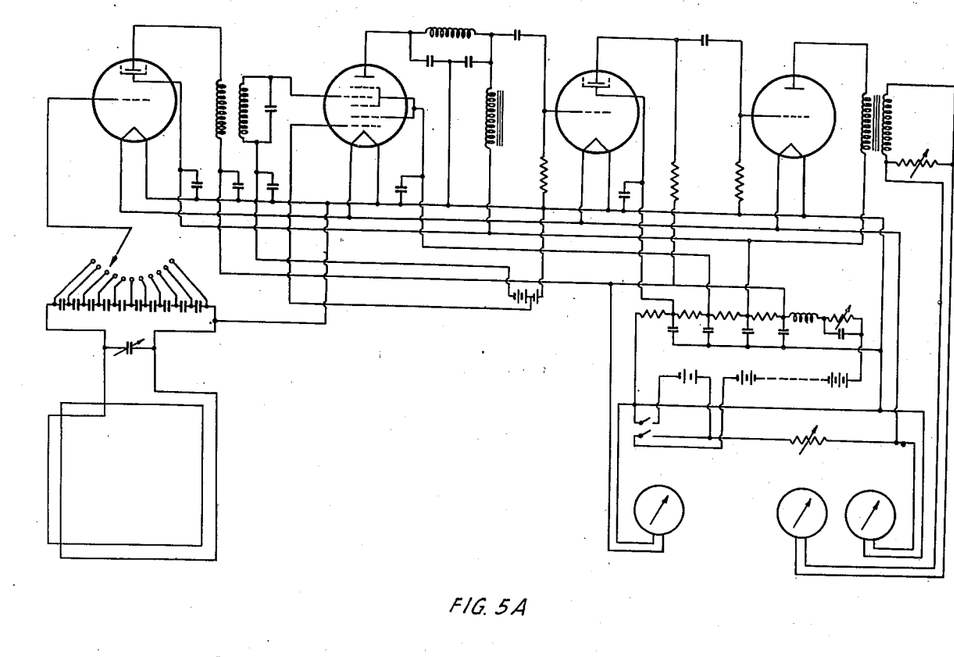
Fig. 5A is a circuit diagram of an alternative form of the receiver for use with the transmitter shown in Fig. 4A, whereby all components of the crystal-controlled heterodyne oscillator appearing in Fig. 5 are omitted.

The description of preferred forms of the transmitter and receiver embodied in this invention now is complete. These forms comprise an unmodulated radio-frequency transmitter whose frequency and amplitude may be maintained at precisely constant values, and a high-gain, heterodyne-type receiver, whose amplification constant may be maintained at a precise level for any position of its calibrated input attenuator. The specification and drawings dealing with the transmitter and receiver are to be regarded as illustrative and not restrictive, for it is obvious to those versed in the art that optional forms of transmitters and receivers may be utilized to carry out the purpose of this invention. For example, a transmitter might be used which generated modulated radio-frequency electromagnetic waves of constant frequency and amplitude, and the use of modulated waves would simplify somewhat the receiver already described, in that the crystal-controlled heterodyne oscillator appearing in Fig. 5 would not be needed. The circuit diagram of the preferred form of modulated transmitter is shown in Fig. 4A. The circuit arrangement for this transmitter is identical with that used with the unmodulated transmitter of Fig. 4, with the exception that the suppressor grid of the radio-frequency amplifier tube $T_2$ (Fig. 4) is brought out through an independent lead which is connected to the filament of $T_2$ through the secondary of the coupling transformer CT, and that the modulator TM has been added by connecting its output terminals to the primary of the transformer CT. The design and construction of the modulator TM, which may be any suitable source of varying current, are well understood by those versed in the radio art, and need no detailed description here. The circuit diagram of the preferred form of receiver for use with the modulated transmitter appears in Fig. 5A. The circuit arrangement of this receiver is identical with that of the heterodyne receiver shown in Fig. 5, with the exception that all components of the crystal-controlled heterodyne oscillator have been omitted. The transmitter and receiver described here have been used successfully in practicing this invention.

Having described in some detail one form of the apparatus embodied in this invention, the general arrangement of said apparatus when employed in the location of hidden faults, we shall now give consideration to one method of operation, to the type of field measurements acquired in its use, and to the technique involved in interpreting the field data thus obtained. First we shall consider the procedure utilized in mapping fault planes.

For simplicity, we shall suppose that the location of the fault plane 28 (Fig. 1) is known, and that on the surface of the earth 18 we arrange a traverse which intersects the strike of the fault at approximately 90 degrees. The transmitter 1 and power source 2 are placed on the line of traverse, a satisfactory electrical "ground" is established at 11, and the antenna 5 is so arranged that it lies in the vertical plane passing through the line of traverse. In actual practice, the transmitter and associated apparatus are placed on the downthrown side of the fault, and removed from one mile to five miles from the surface (or near-surface) trace of the fault under investigation. The low end of the antenna 5 is directed toward the fault plane. The length of the antenna is approximately 130 feet, and as ordinarily used its vertical height at pole 6 is about 4 feet, and at pole 7 some 20 feet. A single-wire antenna of the character described possesses certain directional properties, it being known that, within limits, the maximum field strength occurs along the line of traverse specified.

When the transmitter 1 is energized an unmodulated radio-frequency electromagnetic wave is propagated along the line of traverse, the amplitude of the wave decreasing as the distance from the transmitter increases in accordance with well-known laws. With the particular mode of operation under discussion, the strength of the field accompanying the electromagnetic radiations is next measured through the traverse interval $X_1$—$X_2$ by means of the receiver 13 and loop 15, which are supported by the tripod 14.

If the receiving apparatus is now set up on the line of traverse, with the center of the loop at $X_1$ and with the plane of the loop in the vertical plane passing through the transmitting antenna, then an electromotive force will be induced in the tuned loop circuit, and the reading of the galvanometer $M_3$ will be proportional to the field strength of the electromagnetic waves arriving from the antenna 5. Observing the precautions necessary to maintain constant gain, the receiving apparatus is next moved from $X_1$ to the right in successive steps along the line of traverse, the plane of the loop being oriented as before at each observation point, and the reading of $M_3$ recorded for each station occupied. This procedure is continued, using a station interval of approximately 500 feet, until the center of the receiving loop reaches the point $X_2$, which lies from one-half mile to two miles from the antenna 5. Throughout the series of measurements the power level and frequency of the transmitter 1 are kept constant, the gain of the receiver is maintained at a predetermined value (due allowance being made for the position of the gain-control switch S), and the receiver loop circuit is kept tuned to the frequency of the incoming waves.

Figure 2:
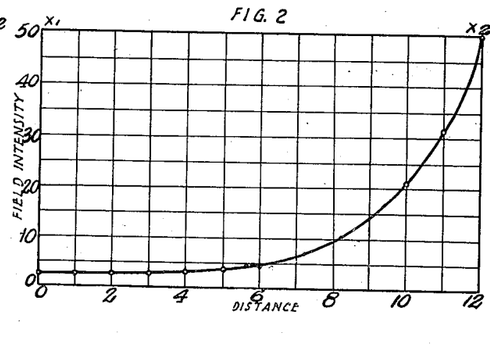
Fig. 2 is a transmission curve which shows the relation between the field intensity at the receiver and the location of the point of observation along the line of traverse $X_1$—$X_2$.
Figure 3:
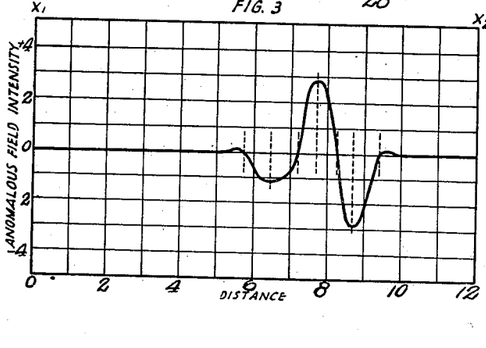
Fig. 3 is a curve displaying the anomalous field intensities arising from a fault plane.

If the reading of the receiver output meter $M_3$ obtained at each station along the traverse is now platted against the distance of the respective station from some reference point on the line of traverse, then for the conditions illustrated in Fig. 1, the plotted values will appear similar to those shown in Fig. 2 (in Fig. 2 and Fig. 3 ordinates and abscissas are expressed in arbitrary units, and abscissas are measured from the point $X_1$). The normal decrease in field strength (the field strength is proportional to the reading of $M_3$) with distance from the transmitting antenna is indicated by the open circles, through which the normal transmission curve is drawn. In the vicinity of the fault zone the values depart from the normal curve, as indicated by the solid circles. The resultant anomaly in field intensity is displayed by the curve of Fig. 3, where the values above the zero reference line represent field intensities greater than the respective values shown by the normal transmission curve, and values below the zero reference line represent field intensities less than indicated by the normal transmission curve. The zero reference line of Fig. 3 thus represents the normal transmission curve of Fig. 2.

Carefully conducted surveys over the Rodessa fault, in Caddo Parish, Louisiana, over the Mount Enterprise fault, in Rusk County, Texas, over the Mexia fault system in Limestone County, Texas, and over numerous other known faults have demonstrated conclusively that the presence of a fault plane will give rise to anomalous field intensities of the general character illustrated in Fig. 3. The anomaly consists essentially of a pronounced maximum which is bounded on one side by a minimum of approximately the same amplitude, and on the other side by a minimum of lesser amplitude. The maximum is invariably located nearer the fault plane than its equivalent minimum, which makes it possible to distinguish between the upthrown and downthrown sides of the fault. These relations are apparent from an inspection of Fig. 3, which was prepared from measurements obtained over a fault of the Mexia system, where the throw of the fault is approximately 400 feet, the angle of dip of the fault plane is about 59 degrees, the transmitting antenna was on the downthrown side of the fault and removed 13,400 feet from the surface trace, the antenna was oriented into the line of traverse and inclined 8 degrees to the level ground surface, and the relation between the normal field intensity and the anomalous field intensity over and adjacent to the fault plane is as shown by the curves of Fig. 2 and Fig. 3, respectively.

The character of the anomaly depends on the angle of dip of the fault plane, the throw of the fault, the distance between the fault plane and the transmitting antenna, the angle between the antenna and a horizontal plane (the antenna is usually erected over level ground), the normal field intensity in the vicinity of the fault, and the electrical properties of the geologic media involved. The principal factors affecting the character of the anomaly are the distance between the fault plane and the antenna, the field strength in the neighborhood of the fault plane, and the throw of the fault. Other conditions remaining the same, the horizontal spread of the anomaly will increase as the distance of separation between the fault plane and the antenna increases, the amplitude of the anomaly will increase as the normal field intensity in the vicinity of the fault plane is increased, and as the throw of the fault increases.

Empirical relations, established from an analysis of the results derived from experimental investigations conducted over known faults, provide the data required to completely define the position of an unknown fault plane when its associated electrical anomaly is known. The horizontal spread of the anomaly is characterized by the seven significant points denoted in Fig. 3 by the intersection of the dotted lines with the zero reference line. Knowing the separation between each of these points and the transmitting antenna, the antenna angle, and the normal field intensity and the anomalous field intensity at each point, the depth of the fault plane vertically beneath each of the seven points specified may be found with the aid of the empirical curves established from surveys over known faults, and the fault plane may be drawn through the depth points thus determined. The throw of an unknown fault may be computed from a consideration of the ratio between the sum of the maximum positive and negative amplitudes of the anomaly, and the average normal field intensity at the points where the maximum and minimum occur, a proportionality factor entering the equation which is arrived at from experimental studies over faults of known vertical displacement.

The depth to which the electrical investigation is carried may be controlled, within limits, thus permitting the examination and location of a fault plane at various depths. This may be accomplished in several ways, the simplest of which is to vary the separation between the fault plane and the transmitting antenna. Increasing separation corresponds to increasing depth of investigation. However, the separation must not be reduced too much, as the character of the field in the proximity of the antenna differs from that at more distant points, and if the separation is decreased below a limiting value (depending principally on the frequency of the transmitter) the readings observed with the receiver are not satisfactory for determining the normal transmission curve.

It is thought desirable at this point to consider briefly a possible explanation of the electrical phenomena which account for the operation of the herein described apparatus and methods when used to determine the location and character of hidden faults.

When the transmitter is energized, electromagnetic waves are propagated along the line of traverse, and these waves cause an induced current to flow in the receiver loop. The velocity of propagation of the waves will be somewhat less in the ground than in the overlying air, for the reason that the velocity is inversely proportional to the square root of the product of the magnetic permeability and the dielectric constant of the media through which the waves travel. This difference in velocity causes a distortion of the advancing wave front, with the result that the wave front leans forward, and the part of the wave front in and adjacent to the ground tends to lag behind the portion in the air. The frequency of the air and ground waves is the same, but the wave length of the ground wave is less than that of the air wave. The tilting of the wave front causes no change in the electromotive force induced in the receiver loop, and for present purposes the air and ground components referred to may be considered collectively, and termed the direct wave.

Meanwhile, simultaneous propagation takes place along a multitude of earth paths, and some of these paths intersect the fault plane at various depths where, in accordance with well-established principles, reflection (and some refraction) of the waves occur, owing to the electrical character of the fault zone, which zone carries concentrations of minerals and solutions whose electrical properties differ greatly from the media on either side of the zone of faulting. A part of the reflected energy, which may be termed the reflected wave, reaches the receiver loop and combines with the direct wave to produce the resultant electromotive force in the loop. The fields associated with the direct wave and the reflected wave are elliptically polarized, and hence the resultant field which induces an electromotive force in the loop is also elliptically polarized. The two fields arising from the direct and reflected waves may or may not be in time phase, and may or may not be in space phase.

Owing to the difference in velocity of propagation of the direct and reflected waves, and to the consequent difference in their wave length, interference phenomena will occur at the surface of the earth at certain points situated between the reflecting fault plane and the transmitting antenna. At some points the phase relations of the direct and reflected waves will be such as to prove additive in causing a current to flow in the receiver loop, while at other points the effect will be subtractive, and tend to reduce the current induced in the loop. Intermediate values of induced current will be observed at points located between the positions corresponding to maximum and minimum current values, and at adjacent points on either side of the maximum and minimum positions. The response curve of Fig. 3 evidences these phenomena. In further support of a theory based on the reflection of electromagnetic waves at a fault plane, and subsequent interference with the direct waves at the receiver loop, it may be stated that variations in the angle of dip of the fault plane, in the distance between the fault plane and the transmitting antenna, in the power level of the transmitter, and in the antenna angle, all tend to confirm the authenticity of the theory. Moreover, when the source of the high-frequency radiation is placed on the side of the fault plane opposite to that indicated in Fig. 1, the location and character of the electrical anomaly are modified in a manner which accords with the results to be anticipated from the hypothesis advanced.

In what has gone before, the term "reflection" is used in its broadest meaning, and not in its strict optical sense. As here employed reflection refers to the process of utilizing alternating fields to induce currents in buried masses (a fault zone, etc.) identified by relatively high electrical admittances, said currents being accompanied by alternating fields which in turn induce other currents in a loop placed at the surface of the earth. Instead of postulating the operation of the present invention of the basis of reflection, whereby interference phenomena are developed between the direct and reflected waves, its operation could be explained equally well by the interaction at the receiver loop 15 of the primary field radiated by the antenna 5 and the secondary field caused by the current induced in the low-impedance buried mass. If strict optical laws were involved, then a particular and exact mutual orientation between the antenna and loop would be an essential requirement at each point of observation, but this is not the case, since the antenna may be oriented in numerous directions, and the loop positioned in many different planes (provided the mutual orientation between the antenna and loop remain the same during a series of observations), and the presence of a fault plane and certain other geologic features (among which may be mentioned a mineralized vein, a salt dome, an igneous plug, or a deposit of oil or gas surrounded by salt water) will give rise to interpretable anomalies in field intensity. Reflection as here defined, and with the limitations imposed, is used merely as a convenient term to express the electrical phenomena outlined, which sometimes are referred to as "reradiation". The term "refraction" is mentioned for the reason that refractive effects may accompany the propagation of the comparatively long electromagnetic waves considered herein.

No very satisfactory reason is known at present for explaining the increase in the amplitude of the fault anomaly which is caused by an increase in the throw of the fault. As a provisional theory to account for this relation, it may be brought out that the electrical discontinuity introduced by the fault zone owes its origin to the physical and chemical agents attending the vertical displacement of the geologic strata, and that it is not unreasonable to suppose that the greater the displacement the more pronounced will be the electrical discontinuity. Regarding the discontinuity as a reflector of electromagnetic waves, it would thus follow that the greater the throw of the fault the more effective would be the fault zone as a reflector, and this in turn would explain the increase in the amplitude of the anomaly as the throw of the fault increases.

Figure 6:
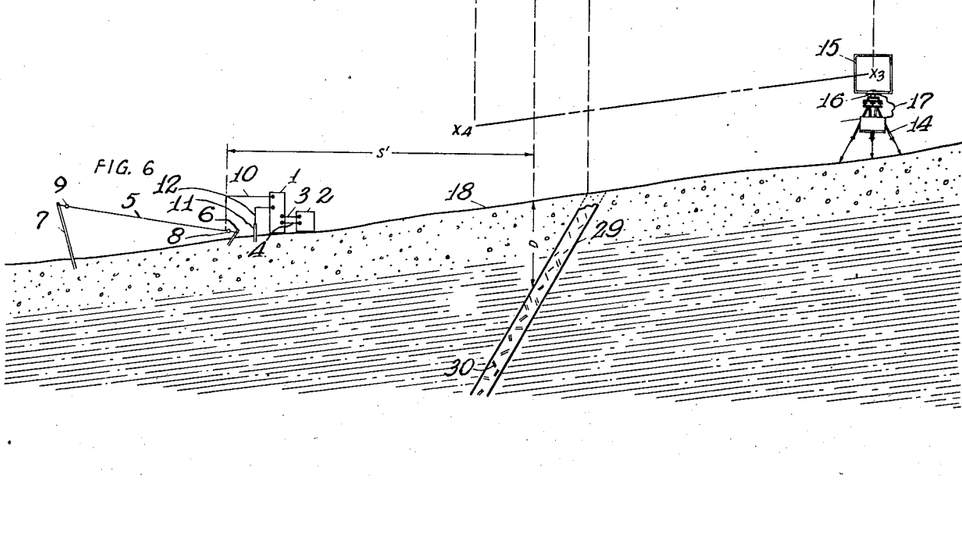
Fig. 6 is a geologic cross-section which includes a mineralized gold vein, and the principal electrical components embodied in this invention.

Consider next the application of the herein described apparatus and methods to the search for mineralized veins. From an electrical viewpoint this case is somewhat analogous to the problem of mapping fault planes. The transmitting and receiving apparatus are set up as shown in Fig. 6, like numerals denoting the like components referred to previously in connection with Fig. 1. The antenna 5 is located on the dip side of the quartz vein 29, which includes the gold veinlets 30, and oriented into the line of traverse $X_3$—$X_4$, which is arranged to cross the strike of the mineralized vein approximately at right angles. The receiving apparatus is now moved along the traverse $X_3$—$X_4$, observations of field intensity being made at intervals of some 25 feet throughout the traverse interval. During the series of observations the frequency and amplitude of the electromagnetic waves generated by the transmitter are maintained constant, the gain of the receiver is kept at a fixed value, due allowance being made for the position of the attenuator switch (denoted S, Fig. 5), and the receiver loop 15 is oriented into the line of traverse with its plane vertical.

Figure 7:
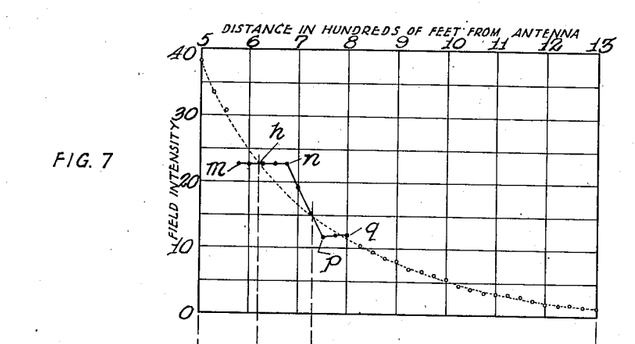
Fig. 7 is a graph displaying the normal and anomalous values of field intensity occurring within the traverse interval $X_3$—$X_4$.

In Fig. 7 the observed values of field intensity are plotted against the distance of the point of observation from the antenna 5. The normal transmission curve is shown as a dotted line through the open circles, and those values in the vicinity of the vein which depart from the normal curve are indicated by solid circles, which are connected with the solid line $mnpq$. It is noted that a steep dip, or "accelerated gradient," occurs in the solid, or anomalous, portion of the field-intensity curve, and that the accelerated gradient occurs in the immediate vicinity of the vein.

The results acquired in checking a large number of known mineralized veins demonstrate that the accelerated gradient, between the points $n$ and $p$, invariably is located directly above the surface outcrop of the vein, or if the vein does not extend to the earth surface, then directly above the intersection of the surface and a prolongation of the vein, as illustrated in Fig. 6.

The position of the intersection of the vertical line drawn through the surface outcrop of the vein and the gradient $np$ is determined chiefly by the separation, or spread S', between the antenna and the vein. An approximate solution for the dip of the vein is arrived at by finding its depth D at a point directly beneath the point $h$, which represents the indicated intersection of the normal and anomalous curves. Empirical data show that D is approximately equal to the spread S' multiplied by a factor whose value is not constant, but varies somewhat with the magnitude of the spread. Other conditions remaining the same, the depth of investigation may be controlled, within limits, by varying the spread, increasing spread corresponding to increasing depth of investigation.

The similarity of the anomaly obtained over a mineralized vein and a fault plane is immediately apparent, and would become more so if the normal transmission curve were rectified and the anomalous values plotted as positive and negative departures from the normal curve, as was done for the fault response curve of Fig. 3. Again we have a maximum bounded on either side by a minimum, the principal minimum lying between the maximum and the antenna and having an amplitude approximating that of the maximum. As with a fault plane, the lesser minimum appears due to an "electrical shadow" caused by the presence of the fault plane or mineralized vein, as the case may be. The "shadow" is more pronounced if the fault or vein extends to the earth surface.

Interference phenomena between the direct and reflected waves seems to account for the character of the anomaly observed over mineralized veins, the electrical properties of the vein differing greatly from that of the surrounding media, and offering a satisfactory reflector for the electromagnetic waves radiated by the antenna.

The response curve illustrated in Fig. 7 was obtained over a gold vein in Havalou gulch, located in the Daveytown district, State of Nevada. The vein did not extend to the surface, and prior to the electrical survey its presence was unknown and unsuspected. The discovery of this gold vein, whose presence was confirmed by trenching and sampling, was due entirely to the present invention. Near the surface the vein assayed approximately 20 dollars per ton in gold, and its dip was about 65 degrees in the direction shown in Fig. 6. The electrical measurements were carried out at a frequency of 1,850 kilocycles, with the antenna oriented into the line or traverse and inclined 8.0 degrees to a horizontal plane. The transmitter and receiver employed have been described previously in connection with Figs. 4 and 5, respectively, except that in the case of the vein apparatus the receiver 13 was not provided with a local heterodyne oscillator, as the high-frequency electromagnetic waves emitted by the transmitter 1 were modulated with a 2,000-cycle audio wave.

Insufficient experimental evidence is available at this time to determine with certainty the relation between the electrical response and the amount of mineralization occurring in a vein. It seems very definite, however, that the anomalous values of field intensity represented by the solid curve of Fig. 7 are traceable to the electrically conductive material present, rather than the quartz, for studies in the same area over quartz veins devoid of commercial quantities of gold have resulted in transmission curves which did not display any suggestion of anomalous values. Moreover, profiles over the Jumbo gold mine, in the near-by Awakening Hills district, have disclosed excellent electrical anomalies of the character under consideration, and here the mineralization occurs not in a quartz-vein deposit, but in a fracture zone of shale and sandstone in the vicinity of dikes. Numerous profiles over a wide variety of geologic conditions suggest strongly that, other factors remaining the same, the amplitude of the anomaly increases with the degree of mineralization.

Gold deposits in veins and fracture zones have been cited to illustrate the application of the herein described apparatus and methods, but it is desired to emphasize the fact that the technique lends itself to the detection and definition of minerals other than gold, which occur in horizontally disposed or inclined deposits, and which are present in concentrated or disseminated volumes. Differential values of electrical impedance, for the frequencies involved, between the mineralized volume and the surrounding media constitute the chief criteria for judging the applicability of the technique under discussion.

Having described one method of operating the present invention in the location of fault planes, and mineralized veins and fracture zones, we shall consider now one method of utilizing the invention to map the presence and location of buried deposits of oil and natural gas.

Figure 8:
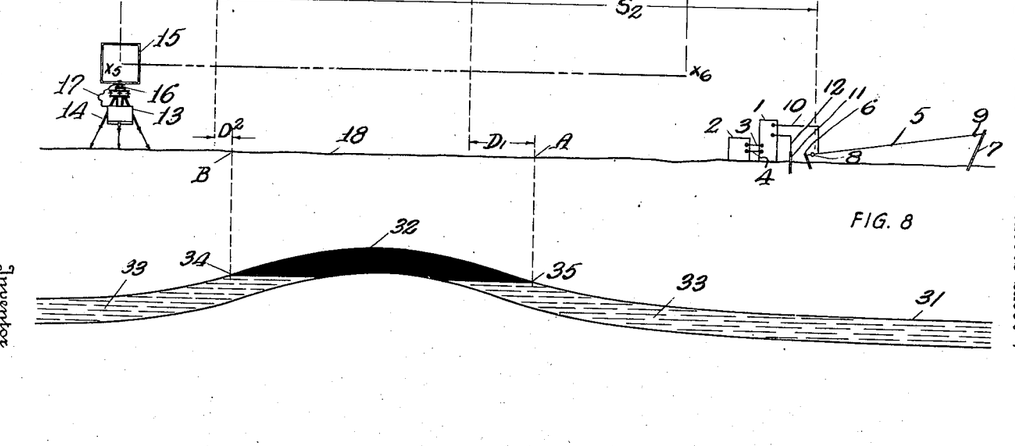
Fig. 8 is a simplified geologic cross-section comprising a single porous stratum which carries both oil and salt water, and the principal electrical components embodied in this invention.

In Fig. 8 is shown the transmitter 1, power source 2, antenna 5, and associated apparatus already described. As before, the antenna is oriented into the line of traverse $X_5$—$X_6$, which is arranged in the manner shown along the surface of the earth 18. For simplicity, the underlying geologic section is represented by the single formation 31, said formation constituting a porous stratigraphic unit in a series of sedimentary beds which are folded into an anticline. The most elevated portion of the formation 31, corresponding to the crest of the anticlinal fold, carries the oil 32, while down the flanks of the structure the salt water 33 is present. It is understood that a plan view of this geologic feature would present a closed area occupied by the oil 32, and surrounded on all sides by an extensive area carrying the salt water 33. The traverse $X_5$—$X_6$ is assumed to pass over the approximate center of the oil area.

Figure 9:
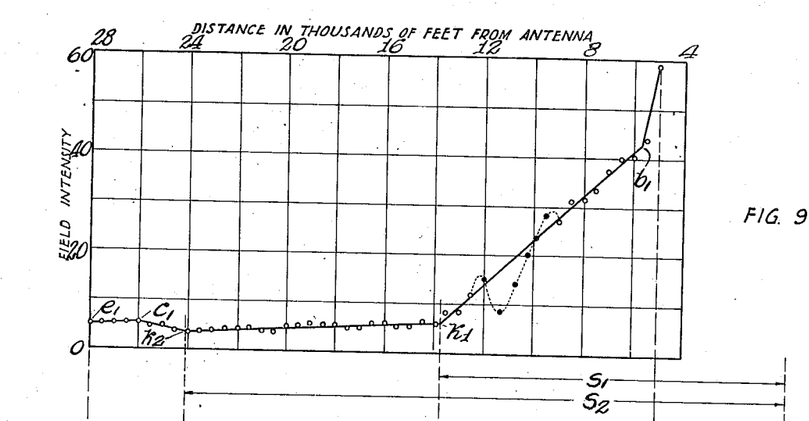
Fig. 9 is a graph showing the values of field intensity observed along the traverse $X_5$—$X_6$.

If the transmitter 1 is now energized and the frequency and amplitude of its electrical oscillations maintained at constant and satisfactory values, and the receiving apparatus is operated at constant gain through the traverse $X_5$—$X_6$, observations being recorded at intervals of some 500 feet with the loop 15 oriented into the line of traverse with its plane vertical, then the field intensities so observed may be plotted against the distance of the point of observation from the antenna 5, and represented by the solid transmission curve of Fig. 9. It is immediately apparent that this curve displays several sharp "breaks" in the field-intensity gradient, and that certain of these breaks occur approximately above the underlying oil-water contacts denoted 34 and 35.

The break in the curve which occurs at $K_1$ is designated the $K_1$ break, and represents the first break (measured from the antenna 5) after the local minimum in field intensity shown by the dotted curve. The local minimum occurs approximately above the oil-water contact 35, while the $K_1$ break is displaced beyond the contact 35 from the antenna 5 by the distance $D_1$, the displacement being a function of the distance, or spread $S_1$, between the break and the antenna, and of the depth of the oil accumulation. For a given depth of the oil zone the displacement $D_1$ increases with the spread $S_1$, and for a particular spread the displacement increases as the depth of the oil zone decreases. The $K_1$ break and associated local minimum constitute a "diagnostic anomaly", that is, an anomaly which is firmly identified with the boundary of an oil and/or gas deposit, and one whose character can not be duplicated by any other cause. The next break in the curve is denoted the $K_2$ break, and is located on the far side of its associated oil-water contact 34 from the antenna 5, the displacement $D_2$ depending chiefly on the depth of the oil deposit, and decreasing in magnitude as the depth of the oil deposit increases. The $K_2$ break frequently is accompanied by a local minimum in field intensity, which is located approximately above its associated oil-water contact.

The data shown in Fig. 9 were obtained over the Van oil field, located in Van Zandt County, Texas. In this field the principal body of oil occurs in the Woodbine sand, which is productive within the depth limits of 2,400 feet to 2,975 feet, the latter depth representing the salt-water level for the field. The electrical measurements were carried out at a frequency of 1,900 kilocycles. The antenna 5 made an angle of 8.0 degrees with a horizontal plane, was removed 10,850 feet from A, a point on the surface directly above the oil-water contact 35, and 23,000 feet from the similar point B, and the $S_1$ and $S_2$ spreads measured 13,700 feet and 23,650 feet, respectively.

Figures 10, 11:
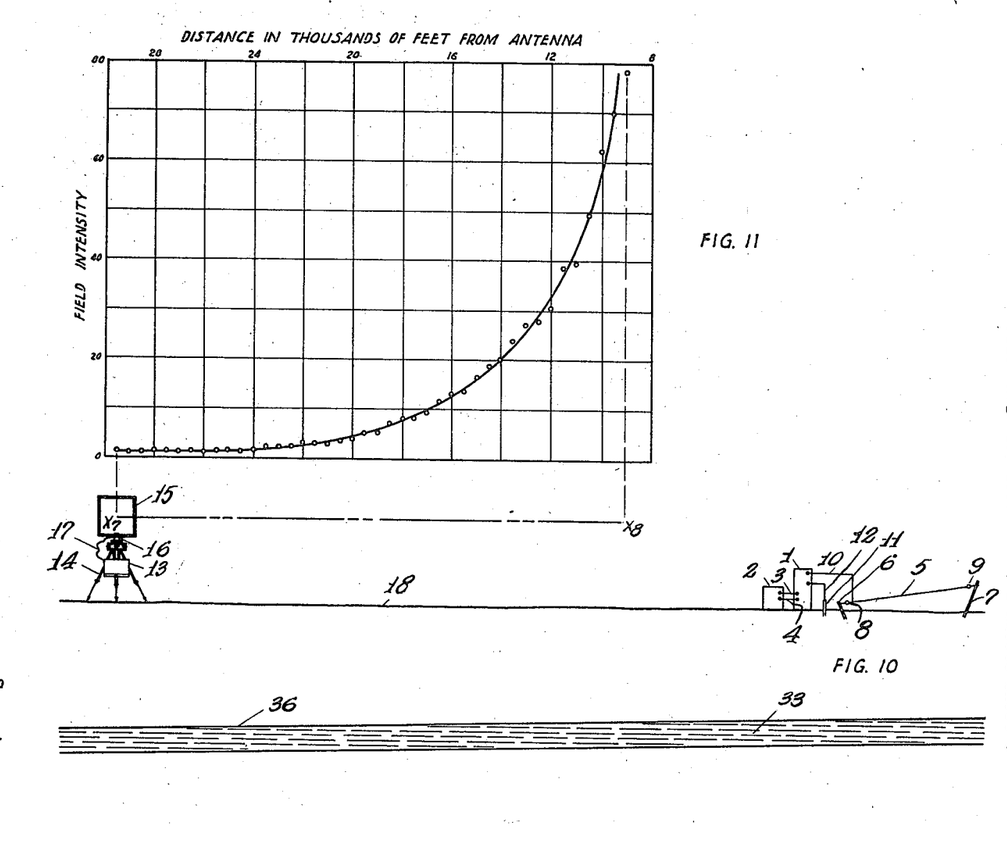
Fig. 10 is a simplified geologic cross-section comprising a single flat-lying porous stratum which carries salt water, and the principal electrical components embodied in this invention.
Fig. 11 is a transmission curve which displays the variation in field intensity along the traverse $X_7$—$X_8$.

The character of the anomalous field-intensity gradients caused by the presence of the body of oil in the Van field will be more easily recognized after an inspection of the type of transmission curve obtained in an area devoid of any oil accumulation. In Fig. 10 is shown the principal electrical components embodied in this invention set up over a simplified geologic cross-section comprising the single flat-lying porous stratum 36 which carries the salt water 33. If the apparatus is operated in accordance with the procedure outlined in connection with Fig. 8, then the "neutral" curve of Fig. 11 will be obtained from the field-intensity observations secured along the traverse $X_7$—$X_8$. Here it is noted that the transmission curve is smooth and gives no evidence of the characteristic breaks and minima traceable to underlying accumulations of oil. The response curve of Fig. 11 was obtained in the near vicinity of the Van field, but sufficiently removed to place all portions of the line of traverse $X_7$—$X_8$ and apparatus well outside of the oil area.

Since initiating experiments with the herein described invention, a total of 1070 miles of profile has been secured in connection with studies involving oil and gas fields, and it is a significant fact that anomalous conditions similar to those indicated in Fig. 9 invariably occur over deposits of oil and gas, and that such conditions are never observed in areas devoid of oil or gas accumulations. The bulk of this research has involved oil fields, where the depth of the oil deposits varied from 375 feet to 6,500 feet, but sufficient work has been conducted over gas fields to suggest strongly that the character of the anomalies obtained is quite similar in the two cases.

A complete and satisfactory understanding of the theoretical considerations concerned in the operation of this invention over oil and gas deposits is lacking, but the mass of empirical data available has led to an adequate knowledge of the elements needed to develop a practical and workable operating technique, and at the present time the apparatus and methods are being utilized commercially in mapping the presence, location, extent and approximate depth of deposits of oil and gas occurring in areas not previously known to contain such deposits. And an abundance of confirmatory evidence is available to establish the essential correctness of the predictions which have been based on the past use of this invention in unknown areas.

The most plausible theory now at hand to account for the results secured over oil and gas accumulations is outlined by the following explanation. When the transmitter 1 (Fig. 8) is energized, electromagnetic waves are propagated from the antenna 5 along and beneath the line of traverse $X_5$—$X_6$, the depth of penetration of the waves increasing, within limits, as the distance from the antenna increases. When these waves encounter the porous formation 31, which carries the deposit of oil 32, and the salt water 33, we have in effect a tabular mass of great lateral extent, which possesses relatively low electrical impedance, and which surrounds an oil-saturated volume having relatively high impedance. It can be shown that the current induced in the low-impedance salt-water stratum 33 under the influence of the electromagnetic waves normally tends to concentrate in a concentric zone immediately surrounding the oil deposit 32. This zone or "ring" of high current density is believed responsible for the elevated values of field intensity appearing between the points $K_1b_1$ and $K_2e_1$ (Fig. 9) respectively, within which intervals occur the significant departures from the neutral transmission curve of Fig. 11. The departures in field intensity within the interval $K_1b_1$ are decidedly more emphasized, in both amplitude and lateral extent, than those between $K_2$ and $e_1$ for the reason that the normal field intensity is considerably greater within the first-mentioned interval, and hence the current induced in that portion of the salt-water stratum 33 situated beneath this interval, and the effect of the induced current on the receiver loop 15, is proportionately greater.

To secure a satisfactory order of current within the concentric ring surrounding the oil deposit, and consequent $K_1$ and $K_2$ breaks, generally requires somewhat critical spacing of the antenna 5 with respect to the oil-water contact 35. If the antenna is removed too far from the contact, then the electromagnetic energy appears to be dissipated before collecting in the current ring and reaching a value which will give rise to the desired anomalous conditions of the transmission curve. On the other hand, if the antenna is brought too near the said contact, then the electromagnetic waves originating at the antenna do not acquire sufficient depth to encounter the low-impedance salt-water stratum before reaching the high-impedance oil deposit, and hence their energy is dissipated. The necessity for using a critical spead between the antenna and the near oil-water contact becomes of increasing importance as the depth of the oil-saturated zone increases. For example, in the Schuler oil field, of Union County, Arkansas, where the present oil production is coming from a depth of about 5,500 feet, the most satisfactory curve breaks were secured when the antenna was removed a horizontal distance of some 21,000 feet from the near oil-water contact, and oftentimes the breaks would disappear entirely if the spread was either increased or decreased by as much as 4,000 feet. However, in the Bellevue oil field, located in Caddo Parish, Louisiana, the depth of the oil zone is but 400 feet, and in this instance good curve breaks were developed with spreads as low as 3,800 feet, the character of the breaks remaining satisfactory even when the spread was greatly increased. The horizontal distance between the points $K_2$ and $c_1$ (Fig. 9) is an indication of the width of the most concentrated portion of the current ring, and frequently furnishes a rough measure of the permissible variation in the antenna spread, other factors remaining unchanged.

When the electromagnetic radiations are properly introduced into the concentric salt-water zone surrounding the oil deposit, a well defined $K_1$ break and associated minimum are secured, and usually a $K_2$ break and accompanying minimum of good character are developed. The $K_2$ break normally is identified by the upward slope of the field-intensity curve shown between $K_2$ and $c_1$ in Fig. 9, though this slope sometimes is downward rather than upward as indicated. The direction of the slope of this part of the curve appears to be influenced by the relative phases at the receiver loop of the electromagnetic fields reaching the loop directly from the antenna and indirectly from that portion of the buried salt-water current ring which lies approximately beneath the point of observation. The phase relation of the two fields is determined, of course, by the velocities of the direct and indirect waves, and by the lengths of their respective paths. If the electromagnetic radiations are not properly introduced into the salt-water zone immediately surrounding the deposit of oil, then neither $K_1$ nor $K_2$ breaks will occur in the transmission curve. Since a satisfactory $K_1$ break invariably appears when the radiations are properly introduced, it follows that a $K_2$ break can not be developed without the occurrence of a $K_1$ break. However, it sometimes happens, due to insufficient length of the line of traverse, improper power level, inadequate ratio between the depth and areal extent of the oil deposit, and other less important factors, that an acceptable $K_2$ break can not be developed even though a $K_1$ break of good character occurs. When this condition can not be remedied, it is necessary to carry out the investigation with the aid of $K_1$ breaks alone. A particular case deserving mention is that of a faulted structure which carries an accumulation of oil or gas. Because of the magnitude and lateral extent of the anomaly which occurs in the neighborhood of a fault plane when the antenna is located on the downthrown side of the fault, which anomaly tends to mask the other anomalies traceable to oil or gas deposits, it is advantageous to survey such fields with the antenna situated on the high side of the fault plane, and thus avoid the difficulties arising from the presence of the fault anomaly. If this is done, then no unusual complexities are involved.

In practicing this invention in a virgin area, when neither the presence, location nor depth of the oil or gas accumulation is known, it is customary to arrange a line of traverse which crosses the area, and then secure field-intensity observations as previously described along this line, commencing, for example, with a short antenna spread. The spread is then increased in increments of about 4,000 feet until a predetermined depth of investigation is reached, the observations along the line of traverse being repeated for each antenna spread. This procedure makes it possible to explore the geologic section from shallow depth to remote depth, and thus indicate the presence of appreciable deposits of oil or gas by defining the boundary of the deposits. For any particular depth of the oil or gas deposit, $K_1$ and $K_2$ breaks of best definition are secured with a particular antenna spread, and consequently the spread is a measure of the depth of the deposit. After the presence of a deposit of oil or gas is established, the outline of the deposit is determined by securing repeated observations along parallel, intersecting or radial lines of traverse which cross the deposit.

In the preceding discussion it has been shown how the herein described invention is used to locate and determine the important characteristics of geologic faults, mineralized veins, and accumulations of oil or gas. It is not to be inferred, however, that these examples constitute the only cases soluble with the invention, for it is excellently adapted to the solution of a number of other structural and stratigraphic problems. Brief reference will be made to two especially important cases, namely, the location and definition of a buried salt dome and a buried igneous plug. Each of these geologic features is frequently associated with the occurrence of petroleum or natural gas.

Figure 12:
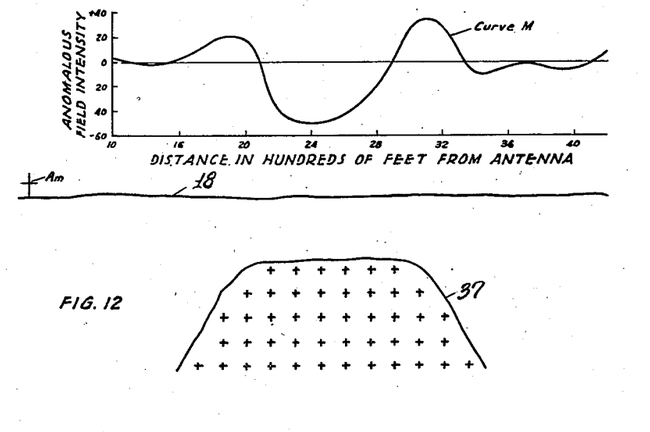
Fig. 12 is a sectional view of a buried salt dome, and an anomalous field-intensity curve obtained along a line of traverse which passed directly over the center of the dome.

Fig. 12 displays a response curve obtained over the Vacherie salt dome, located in Bienville and Webster Parishes, Louisiana. The electrical measurements were carried out in accordance with the procedure already described, along a line of traverse which passed directly over the center of the dome 37. Curve M was secured with the transmitting antenna located at the position $A_m$, and represents the positive and negative departures from the normal transmission curve. It is immediately apparent that the presence of the dome is evidenced by the pronounced minimum in field intensity which occurs over the salt mass, whose upper surface lies at a depth of approximately 800 feet beneath the ground level 18. The width of the dome may be estimated from the lateral extent of the minimum, and thus the contour of the salt mass may be determined by securing repeated curves along the same line of traverse, but with different antenna spreads, it being understood that increasing spread corresponds to increasing depth of investigation. The minimum in field intensity traceable to the presence of the dome is considered due to the relatively low electrical admittance of the salt core for the frequency employed.

Figure 13:
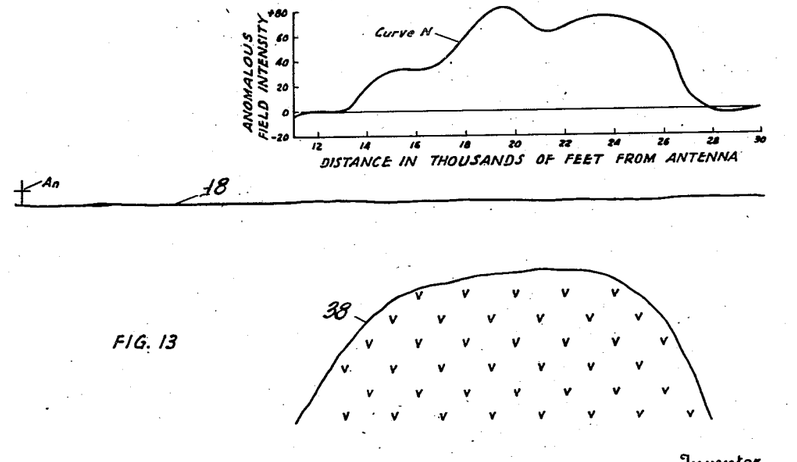
Fig. 13 is a sectional view of a buried igneous plug, and an anomalous field-intensity curve obtained along a line of traverse which passed directly over the center of the plug.

In Fig. 13 is shown an anomalous response curve obtained over the Rison igneous plug, located in Cleveland County, Arkansas. Here again the line of traverse crossed the center of the buried mass 38, and curve N was secured with the antenna position $A_n$. It is noted that in this instance the curve exhibits a maximum in field intensity over the disturbing mass, the increase in field intensity being caused by the relatively high admitance of the material composing the igneous plug. Drilling data show that the buried mass lies at a depth of some 3,600 feet, and its approximate contour was estimated from the results of the electrical survey, and from supplementary magnetic measurements. As in the case of the salt dome, the lateral extent of the field-intensity anomalies, secured with varying antenna spreads, furnishes criteria for computing the width of the disturbing mass at various depths. Moreover, in each case, the amplitude and configuration of the anomalies are an index to the depth of the salt dome or igneous plug, due consideration being given the antenna spread, the power level of the generator, and the amplification constant of the receiver.

The data in Figs. 12 and 13 are presented for the purpose of bringing out clearly the effect on the herein described invention of subsurface variations in electrical admitance. These results suggest the usefulness of the present invention for solving numerous other important geologic problems, and the examples cited in these specifications are to be regarded as illustrative and not restrictive.

In what has gone before, one method of practicing this invention has been outlined. Summarizing, this method is based on measuring at appropriate points the field intensity of that portion of the transmitted electromagnetic field which lies in the vertical plane that includes the transmitting antenna and receiving loop, and on interpreting the geologic significance of the anomalous values of field intensity thus found. It is not intended to restrict the practicing of this invention to the one method of operation described, as recourse to supplementary techniques is at times advantageous. With the method of operation already discussed, the magnitude of a particular component of the resultant vector of an elliptically polarized field is determined, but no consideration is given the total magnitude of the vector, or the position in space of the plane of polarization, both of which are required for a complete definition of the resultant field.

The receiving loop 15 (Fig. 1) may be rotated about a vertical axis and a horizontal axis, and the angles made by the plane of the loop with a vertical and a horizontal plane measured with the aid of graduated circles and the leveling mechanism provided. This arrangement, together with a compass for orienting the loop, make possible the spatial determination of the plane of polariation of the resultant electromagnetic field, and the determination of the magnitude and direction of the major and minor axes of the resultant field. Each of these determinations provides valuable data under certain conditions, for instance, in finding the angle made by the line of traverse with the strike of an unknown fault or mineralized vein. Other considerations might be enumerated, but for present purposes it is sufficient to say that the supplementary measurements mentioned are to be regarded as constituting a part of the technique of operating the apparatus embodied in this invention.

It is understood that the apparatus and methods disclosed herein are susceptible of various modifications without departing from the spirit or broad principles of the invention, and accordingly it is desired to claim all novelty inherent in the invention as broadly as the prior art permits.

What is claimed as new and useful is:

1. In an electromagnetic means of determining geologic features, an apparatus comprising a generator of electromagnetic waves, a means of maintaining constant the frequency of the waves of said generator, a means of adjusting the power level of said generator, a means of maintaining constant the power level of said generator, and an antenna adapted to concentrate in the earth a large part of the electromagnetic energy radiated by said generator.

2. In an electromagnetic means of determining geologic features, an apparatus comprising a sensitive receiver of electromagnetic waves, a suitable amplifier for increasing the amplitude of incoming waves, a means of determining the magnitude of the output of said amplifier, a means of adjusting the amplification constant of said receiver and said amplifier, a means of maintaining at a predetermined value the amplification constant of said receiver and said amplifier, an antenna for energizing said receiver, and a means of selecting the whole or various fractional parts of the antenna current to be transferred to said receiver.

3. In an electromagnetic means of determining geologic features, an apparatus comprising a generator of electromagnetic waves, a means of maintaining constant the frequency of the waves of said generator, and an antenna adapted to concentrate in the earth a large part of the electromagnetic energy radiated by said generator, said generator combined with a sensitive receiver of electromagnetic waves, a suitable amplifier for increasing the amplitude of incoming waves, a means of determining the magnitude of the output of said amplifier, a means of maintaining at a predetermined value the amplification constant of said receiver and said amplifier, an antenna for energizing the receiver, and a means of selecting the whole or various fractional parts of the antenna current to be transferred to said receiver.

4. A transmitting apparatus for use in high-frequency electromagnetic methods of locating and determining the character of geologic features, comprising a relatively powerful generator of unmodulated radio-frequency electromagnetic oscillations, a means of maintaining constant the frequency of said oscillations, a means of maintaining constant the amplitude of said oscillations, a "ground" for establishing electrical contact between said generator and the earth, an antenna adapted to concentrate in said earth a large and variable part of said electromagnetic energy radiated by said generator and to control the direction in which the maximum propagation of said electromagnetic energy takes place.

5. A transmitting apparatus for use in high-frequency electro-magnetic methods of locating and determining the character of geologic features, comprising a relatively powerful generator of modulated radio-frequency electromagnetic oscillations, a means of maintaining constant the frequency of said oscillations, a means of maintaining constant the amplitude of said oscillations, a "ground" for establishing electrical contact between said generator and the earth, an antenna adapted to concentrate in said earth a large and variable part of said electromagnetic energy radiated by said generator and to control the direction in which the maximum propagation of said electromagnetic energy takes place.

6. The method of determining geologic features, comprising the propagation of radio-frequency electromagnetic waves of constant frequency and of constant amplitude, and the steps of measuring and recording that component of the electromagnetic field which lies in a selected plane, said measurements being obtained at a plurality of points within the area surveyed.

7. The method of determining geologic features, comprising the propagation of radio-frequency electromagnetic waves of constant frequency and of constant amplitude from successive locations, and the steps of measuring and recording that component of the electromagnetic field which lies in a selected plane, said measurements being obtained at a plurality of points within the area surveyed.

8. In the art of determining the location and character of faults, mineralized veins and other geologic features by radio-frequency electromagnetic waves, the operation of directing radio waves into the earth toward said fault plane, mineralized vein or other geologic features and the operation of determining the magnitude of the resultant electromagnetic field after its re-radiation by said fault plane, mineralized vein or other geologic feature.

9. In the art of determining the location and character of faults, mineralized veins and other geologic features by radio-frequency electromagnetic waves, the operation of directing radio waves into the earth toward said fault plane, mineralized vein or other geologic feature and the operation of determining the magnitude of the resultant electromagnetic field after its refraction by said fault plane, mineralized vein or other geologic feature.

10. In the art of determining the location and character of faults, mineralized veins and other geologic features by radio-frequency electromagnetic waves, the operation of directing radio waves into the earth toward said fault plane, mineralized vein or other geologic feature and the operation of determining the magnitude of the resultant electromagnetic field after its re-radiation and refraction by said fault plane, mineralized vein or other geologic feature.

11. The method of determining geologic features, comprising the step of operating an oscillator-amplifier to propagate continuous electromagnetic waves of constant frequency and of constant amplitude, and the step of operating a field-intensity measuring device comprising a local oscillator for creating continuous electromagnetic waves of constant frequency and of constant amplitude, said frequency being different from that of said oscillator-amplifier, whereby the difference in frequency between the two oscillators produces a beat note, the amplitude of which is proportional to the field intensity of said oscillator-amplifier at said field-intensity measuring device.

12. The method of determining geologic features, comprising the step of propagating electromagnetic waves, the step of modulating said electromagnetic waves by other waves whose frequency differs from that of said electromagnetic waves, the step of varying the characteristics of the modulating waves, and the step of measuring a selected parameter of the electromagnetic field for each type of modulation at a plurality of points.

13. In the art of determining oil, gas or other mineral deposits, the step of propagating electrical waves from each of a series of sending positions, the step of measuring a selected parameter of the field associated with said electrical waves at a series of spaced points until the observations associated with the propagation from one of said sending positions exhibits an anomaly which disappears when the distance between the location at which said anomaly occurs and the sending position is made substantially more or less than the distance between the location at which said anomaly occurs and the sending position associated with the observations exhibiting said anomaly.

14. In the art of determining oil, gas or other mineral deposits, the step of propagating electrical waves from each of a series of sending positions, the step of measuring a selected parameter of the field associated with said electrical waves at a series of spaced points until the observations associated with the propagation from one of said sending positions exhibits an anomaly which disappears from the observations associated with the propagation from other of said sending positions bracketing the position associated with said anomaly.

15. The method of delineating an oil, gas or other mineral deposit, comprising the step of propagating electrical waves from successive sending points, the step of receiving said electrical waves at successive receiving points, some of which lie above or adjacent to said oil, gas or other mineral deposit, the step of positioning the sending point with respect to the location and depth of said oil, gas or other mineral deposit, and the step of altering the position of said sending point until readings at said receiving points show a diagnostic anomaly which disappears when the spread between said sending point and said oil, gas or other mineral deposit is made substantially more or less than the spread at which said diagnostic anomaly occurs.

16. In the method of determining the depth of an oil, gas or other mineral deposit, the step of propagating electrical waves from each of a series of sending positions, the step of measuring a selected parameter of the field associated with said electrical waves at a series of spaced points until the observations associated with the propagation from one of said sending positions exhibits an anomaly which disappears when the distance between the location at which said anomaly occurs and the sending position is made substantially more or less than the distance between the location at which said anomaly occurs and the sending position associated with the observations exhibiting said anomaly, which distance is a measure of the depth of said oil, gas or other mineral deposit.

WILLIAM M. BARRET.